July 1, 1958 P. H. SAVET 2,841,721
DISCRIMINATOR
Original Filed Feb. 18, 1953
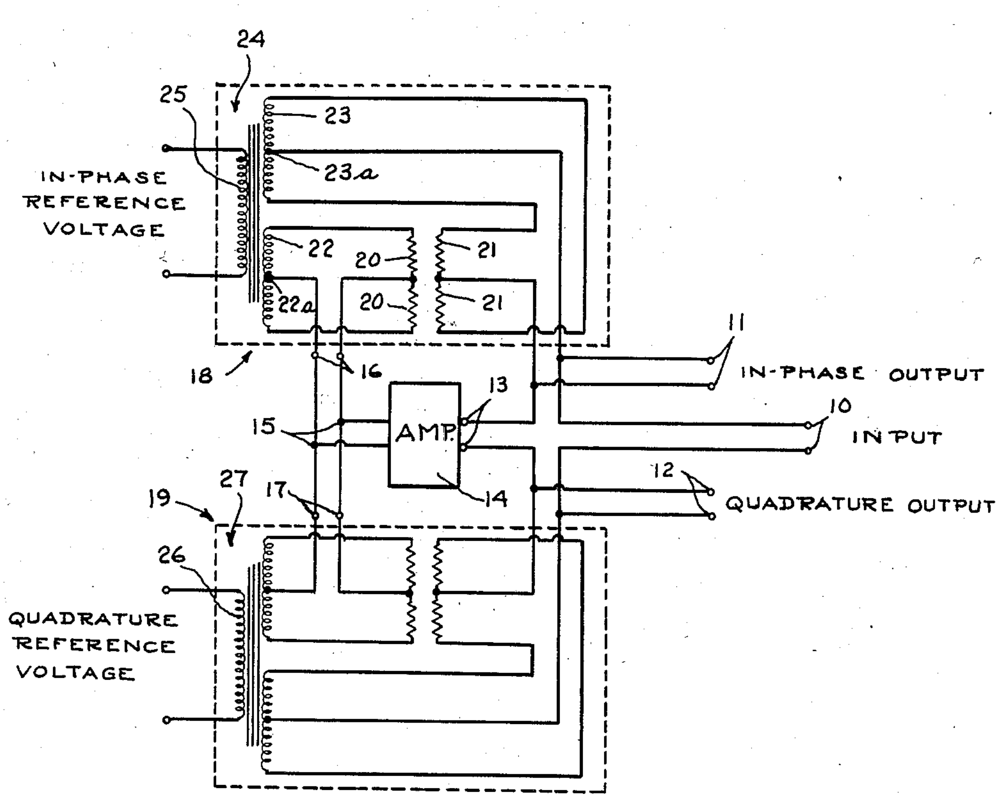
INVENTOR.
PAUL H. SAVET
BY
Raymond A. Paquin
ATTORNEY.

United States Patent Office 2,841,721

Patented July 1, 1958

2,841,721

DISCRIMINATOR

Paul H. Savet, Westbury, N. Y., assignor to American Bosch Arma Corporation, a corporation of New York Continuation of application Serial No. 337,483, February 18, 1953. This application October 2, 1956, Serial No. 613,544

2 Claims. (Cl. 307—149)

The present invention relates to discriminators for separating the inphase and quadrature components of a signal voltage and has particular reference to a circuit using a single high gain amplifier with auxiliary phase-sensitive circuits to accomplish this result.

This application is a continuation of my application Serial Number 337,483 filed February 18, 1953, now abandoned.

In a preferred embodiment of the present invention the output signal of a thermal unit, sensitive only to inphase voltage, and the output signal of a second thermal unit, sensitive only to quadrature voltage, are fed back degeneratively with the signal voltage to the input of a high gain amplifier, the output of which is applied to both thermal units. By this device, the output of one thermal unit is substantially the inphase component of the signal, and the output of the other thermal unit is substantially the quadrature component of the signal.

For a better understanding of the invention, reference may be had to the accompanying diagrams, in which the drawing is a schematic circuit diagram of the preferred embodiment of the invention.

In the drawing the signal voltage having both inphase and quadrature components is supplied to terminals 10, while the inphase component is made available at terminals 11 and the quadrature component is made available at terminals 12. Terminals 10, 11, and 12 are connected in series with the input terminals 13 of high gain amplifier 14, the output terminals 15 of which are connected to the signal input terminals 16 and 17 of the phase sensitive devices 18 and 19.

The phase sensitive devices 18 and 19 are preferably, but not limited to, thermal units of the type fully disclosed in copending U. S. patent application Serial Number 242,957, filed August 21, 1951 for Circuit Coupling Device in the name of Joseph Statsinger and assigned to the assignee of this invention but will be briefly discussed here for completeness.

The thermal unit 18 comprises the pair of low coefficient of temperature resistors 20, 20 thermally coupled to a pair of high temperature coefficient 21, 21, each pair of resistors 20, 20 and 21, 21 being connected in series and energized by the respective secondary windings 22 and 23 of transformer 24. The signal input terminals 16 of unit 18 are connected to the center tap 22_a_ of winding 22 and the junction of the resistor pairs 20, 20, while the output of the unit is taken between the junction of resistors 21, 21 and the center tap 23_a_ of secondary winding 23. In a unit of this type, the component of an input signal which is inphase with the reference voltage energizing the primary winding 25 of the transformer 24 causes differential heating of the resistors 20, 20 which reflected to the resistors 21, 21 produces a voltage proportional in magnitude to the inphase component of the input signal at the output of the unit. It should be noted that a component of the input voltage in quadrature with the reference voltage produces no differential heating of the resistors 20, 20 and consequently no portion of the quadrature appears in the output.

Therefore, if the reference voltage energizing primary winding 25 is of zero reference phase with respect to the inphase signal voltage at terminals 10, and the voltage energizing the primary winding 26 of the transformer 27 in unit 19 is of 90° phase, i. e., is in quadrature with the voltage at primary winding 25, then the voltage at terminals 11 will be an inphase voltage, while the voltage at terminals 12 is a quadrature voltage.

It will be shown, using the symbols listed below, that for the conditions of the drawing the output at terminals 11 is substantially the inphase component of the input voltage at terminals 10, and the output at terminals 12 is substantially the quadrature component of the voltage at terminals 10.

$I=R+jQ$=input at terminals 10
$A$=voltage at terminals 11
$jB$=voltage at terminals 12
$C$=voltage input of amplifier 14
$D$=voltage output of amplifier 14
$K_1$=gain of thermal unit 18
$K_2$=gain of thermal unit 19
$G$=gain of amplifier 14

Now, $A=(\text{Real part of } D)\times K_1=(\text{Real part of } C)\times G\times K_1$ But $C=I-A-jB=R-A+j(Q-B)$ Therefore $A=K_1G(R-A)$ And $$A=\frac{R(K_1G)}{1+(K_1G)}$$

If $K_1G$ is large compared to unity, then A is substantially equal to R, and the voltage at terminals 11 is substantially equal to the real part of the input signal, I.

Similarly $jB=K_2$ (imaginary part of $D$)= $K_2G$ (imaginary part of $C$)

So that $jB=j(Q-B)K_2G$

And $$jB=jQ\left[\frac{K_2G}{1+K_2G}\right]$$

If $K_2G$ is large compared to unity, then $jB$ is substantially equal to $jQ$ and the voltage at terminals 12 is substantially equal to the quadrature component of the input signal I.

In order to make the factors $K_1G$ and $K_2G$ large with respect to unity, the amplifier 14 is chosen to have a high gain since the gain $K_1$ and $K_2$ through the units 18 and 19 is usually small.

It can be seen that the present invention offers a simple method for discrimination of inphase and quadrature components from a signal source using only one amplifier. The signal input to the amplifier is small so that there is little danger of saturating the amplifier.

Although the invention has been shown and described as using thermal units 18 and 19 for separating the inphase and quadrature components, the invention is not to be limited thereby, but other types of circuits for a similar purpose may be used, such as demodulator-modulator devices, for example.

I claim:

1. In a device of the character described, an electrical signal source producing an electrical signal containing an inphase component and a quadrature component, an amplifier having an input and an output, a first pair of series connected heating resistors and a first pair of series connected heated resistors in close thermal contact but electrically isolated from each other, a source of inphase reference voltages connected to energize each of said first pairs of resistors equally, a second pair of series connected heating resistors and a second pair of series connected heated resistors in close thermal contact but electrically isolated from each other, a source of quadrature phase reference voltages connected to energize equally each of said second pair of heating resistors, electrical connections between the output of said amplifier and said first and second pairs of heating resistors whereby the heating resistors are unbalanced according to a portion of said amplifier output, electrical connections between the input of said amplifier, said electrical signal source and each of said first and second pairs of heated resistors.

2. In a device of the character described, an electrical signal source producing an electrical signal containing an inphase component and a quadrature component, an amplifier having an input and an output, a first pair of series connected heating resistors and a first pair of series connected heated resistors in close thermal contact but electrically isolated from each other, a source of inphase reference voltages connected to energize each of said first pairs of resistors equally, a second pair of series connected heating resistors and a second pair of series connected heated resistors in close thermal contact but electrically isolated from each other, a source of quadrature phase reference voltages connected to energize equally each of said second pairs of heating resistors, electrical connections between the output of said amplifier and said first and second pairs of heating resistors whereby the heating resistors are unbalanced according to a portion of said amplifier output for differentially heating said resistors, electrical connections between the input of said amplifier, said electrical signal source and each of said first and second pairs of heated resistors.

No references cited.